United States Patent
Gammerman et al.

(10) Patent No.: US 7,072,873 B1
(45) Date of Patent: Jul. 4, 2006

(54) DATA CLASSIFICATION APPARATUS AND METHOD THEREOF

(75) Inventors: Alex Gammerman, Egham (GB); Volodya Vovk, Egham (GB)

(73) Assignee: Royal Holloway University of London, Egham (GB)

( * ) Notice: Subject to any disclaimer, the term of this patent is extended or adjusted under 35 U.S.C. 154(b) by 0 days.

(21) Appl. No.: 09/831,262

(22) PCT Filed: Nov. 9, 1999

(86) PCT No.: PCT/GB99/03737

§ 371 (c)(1),
(2), (4) Date: Jun. 29, 2001

(87) PCT Pub. No.: WO00/28473

PCT Pub. Date: May 18, 2000

(30) Foreign Application Priority Data

Nov. 9, 1998 (GB) .................................. 9824552.5

(51) Int. Cl.
   *G06E 1/00* (2006.01)
(52) U.S. Cl. ........................................... 706/20; 706/12
(58) Field of Classification Search ................. 706/20, 706/21, 25, 48; 600/301; 704/203, 251, 704/239–240
See application file for complete search history.

(56) References Cited

U.S. PATENT DOCUMENTS

| | | | | |
|---|---|---|---|---|
| 5,315,313 A | * | 5/1994 | Shinagawa | ................... 345/159 |
| 5,361,379 A | | 11/1994 | White | |
| 5,479,573 A | * | 12/1995 | Keeler et al. | ................... 706/21 |
| 5,577,166 A | * | 11/1996 | Mizuno | ....................... 706/20 |
| 5,608,841 A | * | 3/1997 | Tsuboka | ...................... 704/256 |
| 5,625,748 A | * | 4/1997 | McDonough et al. | ....... 704/251 |
| 5,640,492 A | * | 6/1997 | Cortes et al. | ................... 706/20 |
| 5,649,068 A | | 7/1997 | Boser et al. | |
| 5,846,189 A | * | 12/1998 | Pincus | ......................... 600/301 |
| 6,278,970 B1 | * | 8/2001 | Milner | ......................... 704/203 |

FOREIGN PATENT DOCUMENTS

| | | | |
|---|---|---|---|
| EP | 0450825 A2 | * | 10/1991 |
| EP | 450825 A2 | * | 10/1991 |
| GB | 2080072 A | * | 1/1982 |
| GB | 2369899 A | * | 6/2002 |

OTHER PUBLICATIONS

G.A. Carpenter, W.D. Ross; "ART-EMAP: A neural network architecture for object recognition by evidence accumulation"; IEEE Transactions on Neural Networks; vol. 6, Iss. 4, Jul. 1995; pp. 805-818.*

(Continued)

*Primary Examiner*—Wilbert L. Starks
*Assistant Examiner*—Mai T. Tran
(74) *Attorney, Agent, or Firm*—Leydig, Voit & Mayer, Ltd.

(57) ABSTRACT

The data classification apparatus and method is adapted to high-dimensional classification problems and provide a universal measure of confidence that is valid under the iid assumption. The method employs the assignment of strangeness values to classification sets constructed using classification training examples and an unclassified example. The strangeness values of p-values are compared to identify the classification set containing the most likely potential classification for the unclassified example. The measure of confidence is then computed on the basis of the strangeness value of the classification set containing the second most likely potential classification.

6 Claims, 3 Drawing Sheets

| | Test | Set | | | | | | | | |
|---|---|---|---|---|---|---|---|---|---|---|
| Example No. | 1 | 2 | 3 | 4 | 5 | 6 | 7 | 8 | 9 | 10 |
| Example | i | 7 | ? | 1 | 7 | 1 | 1 | 1 | 7 | 7 |
| True Class | 1 | 7 | 7 | 1 | 7 | 1 | 1 | 1 | 7 | 7 |
| Predicted Class | 1 | 7 | 7 | 1 | 7 | 1 | 1 | 1 | 7 | 7 |
| Confidence | 95% | 95% | 95% | 95% | 95% | 95% | 95% | 95% | 95% | 95% |
| Credibility | 19% | 100% | 100% | 100% | 100% | 28% | 100% | 100% | 100% | 100% |

OTHER PUBLICATIONS

C.H. Wu, G.M. Whitson, C.-T. Hsiao, C.-F. Huang; "Classification Artificial Neural Systems for Genome Research";Proceedings of the 1992 ACM/IEEE Conference on Supercomputing; Dec. 1992; pp. 797-803.*

Carpenter et al; ART-EMAP: A neural network architecture for object recognition by evidence accumulation; IEEE Transactions on Neural Networks; vol. 6, Is. 4; Jul. 1995, pp. 805-818.*

Wu et al; Classification artificial neural systems for genome research; Proceedings Supercomputing; Nov. 16-20, 1992; pp. 797-803.*

Proedrou et al; Transductive Confidence Machines for Pattern Recognition; ECML LNAI 2430; 2002; pp. 381-390.*

Melluish et al; Comparing the Bayes and typicalness frameworks; Proceedings of ECML 01, Lecture Notes; 2001; pp. 1-13.*

Feyh; Statistics of maximum entropy IID noise given its cumulants; Conference Record of The Twenty-Sixth Asilomar Conference on Signals, Systems and Computers; vol. 2; Oct. 26-28, 1992; pp. 736-740.*

Kulkarni et al; On the existence of strongly consistent rules for estimation and classification; IEEE International Symposium on Information Theory Proceedings; Sep. 17-22, 1995; pp. 255.*

A. Gammerman, V. Vovk, V. Vapnik: *Learning by Transduction*.

Uncertainty in Artificial Intelligence. Proceedings of the Fourteenth Conference (1998).

Gammerman et al. *Learning by Transduction*, Uncertainty in Artificial Intelligence. Proceedings of the Fourteenth Conference (1998), Proceedings of Uncertainty in Artificial Intelligence (UAI-98), Madison, WI, USA, Jul. 24-26, 1998, pp. 148-155, XP000869654 1998, San Francisco, CA, USA, Morgan Kaufman Publishers, USA ISBN: 1-55860-555-X.

Backer and Duin, *Statistiche Patroonherkennung* ISBN 9065621059, 1989 pp. 129-137.

* cited by examiner

| | Training Set | | | | | Test Set | |
|---|---|---|---|---|---|---|---|
| Example No. | 1 | 2 | 3 | 4 | 5 | 1 | 2 |
| Example | 1 | 7 | 1 | 7 | 7 | 7 | 1 |
| Classification | 1 | 7 | 1 | 7 | 7 | ? | ? |

| Example No. | 1 | 2 | 3 | 4 | 5 | 6 | 7 | 8 | 9 | 10 |
|---|---|---|---|---|---|---|---|---|---|---|
| Example | | 7 | 7 | 1 | 7 | 1 | 1 | 1 | 7 | 7 |
| True Class | 1 | 7 | 7 | 1 | 7 | 1 | 1 | 1 | 7 | 7 |
| Predicted Class | 1 | 7 | 7 | 1 | 7 | 1 | 1 | 1 | 7 | 7 |
| Confidence | 95% | 95% | 95% | 95% | 95% | 95% | 95% | 95% | 95% | 95% |
| Credibility | 19% | 100% | 100% | 100% | 100% | 28% | 100% | 100% | 100% | 100% |

Test Set

Figure 4

DATA CLASSIFICATION APPARATUS AND METHOD THEREOF

BACKGROUND OF THE INVENTION

The present invention relates to data classification apparatus and an automated method of data classification thereof that provides a universal measure of confidence in the predicted classification for any unknown input. Especially, but not exclusively, the present invention is suitable for pattern recognition, e.g. optical character recognition.

In order to automate data classification such as pattern recognition the apparatus, usually in the form of a computer, must be capable of learning from known examples and extrapolating to predict a classification for new unknown examples. Various techniques have been developed over the years to enable computers to perform this function including, inter alia, discriminant analysis, neural networks, genetic algorithms and support vector machines. These techniques usually originate in two fields: machine learning and statistics.

Learning machines developed in the theory of machine learning often perform very well in a wide range of applications without requiring any parametric statistical assumptions about the source of data (unlike traditional statistical techniques); the only assumption made is the iid assumption (the examples are generated from the same probability distribution independently of each other). A new approach to machine learning is described in U.S. Pat. No. 5,640,492, where mathematical optimisation techniques are used for classifying new examples. The advantage of the learning machine described in U.S. Pat. No. 5,640,492 is that it can be used for solving extremely high-dimensional problems which are infeasible for the previously known learning machines.

A typical drawback of such techniques is that the techniques do not provide any measure of confidence in the predicted classification output by the apparatus. A typical user of such data classification apparatus just hopes that the accuracy of the results from previous analyses using benchmark datasets is representative of the results to be obtained from the analysis of future datasets.

Other options for the user who wants to associate a measure of confidence with new unclassified examples include performing experiments on a validation set, using one of the known cross-validation procedures, and applying one of the theoretical results about the future performance of different learning machines given their past performance. None of these confidence estimation procedures though provides any practicable means for assessing the confidence of the predicted classification for an individual new example. Known confidence estimation procedures that address the problem of assessing the confidence of a predicted classification for an individual new example are ad hoc and do not admit interpretation in rigorous terms of mathematical probability theory.

Confidence estimation is a well-studied area of both parametric and non-parametric statistics. In some parts of statistics the goal is classification of future examples rather than of parameters of the model, which is relevant to the need addressed by this invention. In statistics, however, only confidence estimation procedures suitable for low-dimensional problems have been developed. Hence, to date mathematically rigorous confidence assessment has not been employed in high-dimensional data classification.

SUMMARY OF THE INVENTION

The present invention provides a new data classification apparatus and method that can cope with high-dimensional classification problems and that provides a universal measure of confidence, valid under the iid (independently and identically distributed) assumption, for each individual classification prediction made by the new data classification apparatus and method.

The present invention provides data classification apparatus comprising: an input device for receiving a plurality of training classified examples and at least one unclassified example; a memory for storing the classified and unclassified examples; an output terminal for outputting a predicted classification for the at least one unclassified example; and a processor for identifying the predicted classification of the at least one unclassified example wherein the processor includes: classification allocation means for allocating potential classifications to each unclassified example and for generating a plurality of classification sets, each classification set containing the plurality of training classified examples and the at least one unclassified example with its allocated potential classification; assay means for determining a strangeness value for each classification set; and a comparative device for selecting a classification set containing the most likely allocated potential classification for at least one unclassified example, whereby the predicted classification output by the output terminal is the most likely allocated potential classification, according to the strangeness values assigned by the assay means.

In the preferred embodiment the processor further includes a strength of prediction monitoring device for determining a confidence value for the predicted classification on the basis of the strangeness value of a set containing the at least one unclassified example with the second most likely allocated potential classification.

With the present invention the conventional data classification technique of induction learning and then deduction for new unknown data vectors is supplanted by a new transduction technique that avoids the need to identify any all encompassing general rule. Thus, with the present invention no multidimensional hyperplane or boundary is identified. The training data vectors are used directly to provide a predicted classification for unknown data vectors. In other words, the training data vectors implicitly drive classification prediction for an unknown data vector.

It is important to note that with the present invention the measure of confidence is valid under the general iid assumption and the present invention is able to provide measures of confidence for even very high dimensional problems.

Furthermore, with the present invention more than one unknown data vector can be classified and a measure of confidence generated simultaneously.

In a further aspect the present invention provides data classification apparatus comprising: an input device for receiving a plurality of training classified examples and at least one unclassified example; a memory for storing the classified and unclassified examples; stored programs including an example classification program; an output terminal for outputting a predicted classification for the at least one unclassified example; and a processor controlled by the stored programs for identifying the predicted classification of the at least one unclassified example wherein the processor includes: classification allocation means for allocating potential classifications to each unclassified example and for generating a plurality of classification sets, each classification set containing the plurality of training classified examples and the at least one unclassified example with its allocated potential classification; assay means for determining a strangeness value for each classification set; and a comparative device for selecting a classification set containing the most likely allocated potential classification for the at least one unclassified example, whereby the predicted classification output by the output terminal is the most likely allocated potential classification, according to the strangeness values assigned by the assay means.

In a third aspect the present invention provides a data classification method comprising:

inputting a plurality of training classified examples and at least one unclassified example;

identifying a predicted classification of the at least one unclassified example which includes allocating potential classifications to each unclassified example;

generating a plurality of classification sets each containing the plurality of training classified examples and the at least one unclassified example with an allocated potential classification;

determining a strangeness value for each classification set; and selecting, according to the assigned strangeness values, a classification set containing the most likely allocated potential classification; and outputting the predicted classification for the at least one unclassified example whereby the predicted classification output by an output terminal is the most likely allocated potential classification.

It will, of course, be appreciated that the above method and apparatus may be implemented in a data carrier on which is stored a classification program.

BRIEF DESCRIPTION OF THE DRAWINGS

An embodiment of the present invention will now be described by way of example only with reference to the accompanying drawings, in which:

FIG. 4 is a tabulation of experimental results where a data classifier in accordance with the present invention was used in character recognition.

DESCRIPTION OF PREFERRED EMBODIMENT

Figures 1, 3:
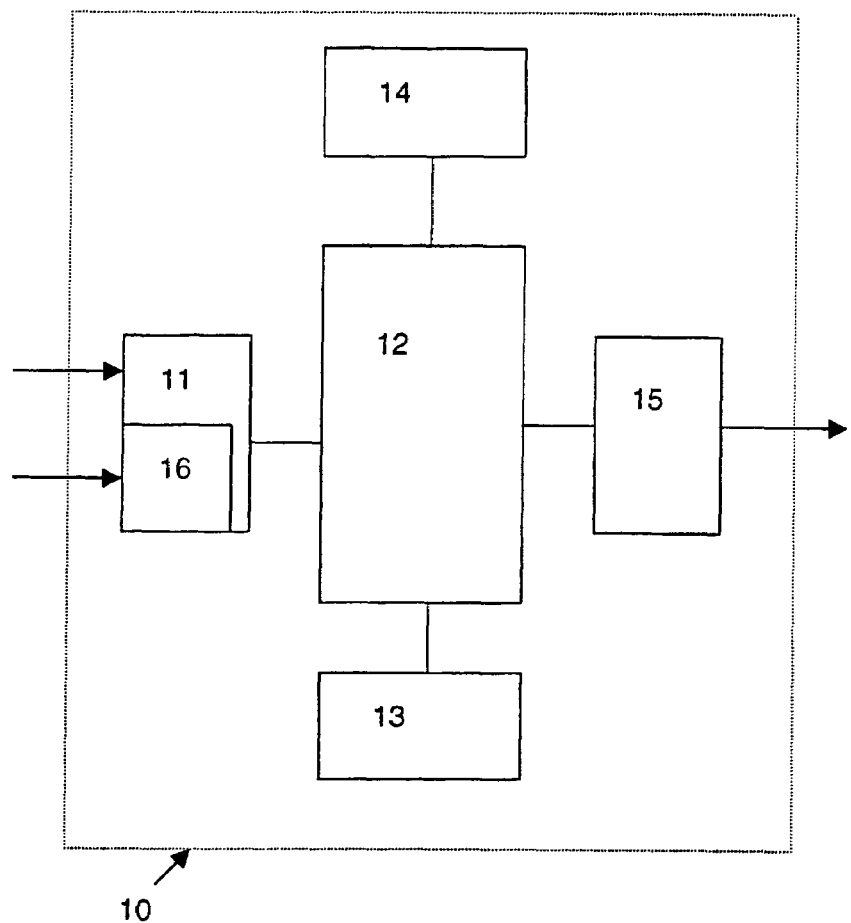
FIG. 1 is a schematic diagram of data classification apparatus in accordance with the present invention.
FIG. 3 is a table showing a set of training examples and unclassified examples for use with a data classifier in accordance with the present invention.

In FIG. 1 a data classifier 10 is shown generally consisting of an input device 11, a processor 12, a memory 13, a ROM 14 containing a suite of programs accessible by the processor 12 and an output terminal 15. The input device 11 preferably includes a user interface 16 such as a keyboard or other conventional means for communicating with and inputting data to the processor 12 and the output terminal 15 may be in the form of a display monitor or other conventional means for displaying information to a user. The output terminal 15 preferably includes one or more output ports for connection to a printer or other network device. The data classifier 10 may be embodied in an Application Specific Integrated Circuit (ASIC) with additional RAM chips. Ideally, the ASIC would contain a fast RISC CPU with an appropriate Floating Point Unit.

To assist in an understanding of the operation of the data classifier 10 in providing a prediction of a classification for unclassified (unknown) examples, the following is an explanation of the mathematical theory underlying its operation.

Two sets of examples (data vectors) are given: the training set consists of examples with their classifications (or classes) known and a test set consisting of unclassified examples. In FIG. 3, a training set of five examples and two test examples are shown, where the unclassified examples are images of digits and the classification is either 1 or 7.

The notation for the size of the training set is l and, for simplicity, it is assumed that the test set of examples contains only one unclassified example. Let (X,A) be the measurable space of all possible unclassified examples (in the case of FIG. 3, X might be the set of all 16×16 grey-scale images) and (Y,B) be the measurable space of classes (in the case of FIG. 3, Y might be the 2-element set $\{1, 7\}$). Y is typically finite.

The confidence prediction procedure is a family $\{f_\beta : \beta \epsilon (0, 1]\}$ of measurable mappings $f_\beta : (X \times Y)^l \times X \to B$ such that:

1. For any confidence level $\beta$ (in data classification typically we are interested in $\beta$ close to 1) and any probability distribution P in X×Y, the probability that $$y_{l+1} \epsilon f_\beta(x_1, y_1, \ldots, x_l, y_l, x_{l+1})$$

is at least $\beta$, where $(x_1, y_1), \ldots, (x_l, y_l), (x_{l+1}, y_{l+1})$ are generated independently from P.

2. If $\beta_1 < \beta_2$, then, for all $(x_1, y_1), \ldots, x_l, y_l, x_{l+1}) \epsilon (X \times Y)^l \times X$, $$f_{\beta_1}(x_1, y_1, \ldots, x_l, y_l, x_{l+1}) \subseteq f_{\beta_2}(x_1, y_1, \ldots, x_l, y_l, x_{l+1})$$

The assertion implicit in the prediction $f_{\beta_1}(x_1, y_1, \ldots, x_l, y_l, x_{l+1})$ is that the true label $y_{l+1}$ will belong to $f_{\beta_1}(x_1, y_1, \ldots, x_l, y_l, x_{l+1})$. Item 1 requires that the prediction given by $f_\beta$ should be correct with probability at least $\beta$, and item 2 requires that the family $\{f_\beta\}$ should be consistent: if some label y for the (l+1)th example is allowed at confidence level $\beta_1$, it should also be allowed at any confidence level $\beta_2 > \beta_1$.

A typical mode of use of this definition is that some conventional value of $\beta$ such as 95% or 99%, is chosen in advance, after which the function $f_\beta$ is used for prediction. Ideally, the prediction region output by $f_\beta$ will contain only one classification.

An important feature of the data classification apparatus is defining $f_\beta$ in terms of solutions $\alpha_i$, i=1, . . . , l+1, to auxiliary optimisation problems of the kind outlined in U.S. Pat. No. 5,640,492, the contents of which is incorporated herein by reference. Specifically, we consider |Y| completions of our data $$(x_1, y_1), \ldots, (x_l, y_l), x_{l+1}$$

the completion y, yϵY, is $$(x_1, y_1), \ldots, (x_l, y_l), (x_{l+1}, y)$$

(so in all completions every example is classified).

With every completion $$(x_1, y_1), \ldots, (x_l, y_l), (x_{l+1}, y_{l+1})$$

(for notational convenience we write $y_{l+1}$ in place of y here) is associated the optimisation problem $$\frac{1}{2}(w \cdot w) + C\left(\sum_{i=1}^{l+1} \xi_i\right) \to \min \quad (1)$$

(where C is a fixed positive constant)

subject to the constraints $$y_i((x_i \cdot w) + b) \geq \xi_i, \ i=1,\ldots,l+1 \quad (2)$$

This problem involves non-negative variables $\xi_i \geq 0$, which are called slack variables. If the constant C is chosen too large, the accuracy of solution can become unacceptably poor; C should be chosen as large as possible in the range in which the numerical accuracy of solution remains reasonable. (When the data is linearly separable, it is even possible to set C to infinity, but since it is rarely if ever possible to tell in advance that all completions will be linearly separable, C should be taken large but finite.)

The optimisation problem is transformed, via the introduction of Lagrange multipliers $\alpha_i$, $i=1,\ldots,l+1$, to the dual problem: find $\alpha_i$ from $$\sum_{i=1}^{l+1} \alpha_i - \frac{1}{2}\sum_{i,j=1}^{l+1} y_i y_j \alpha_i \alpha_j (x_i \cdot x_j) \to \max \quad (3)$$

under the "box" constraints $$0 \leq \alpha_i \leq C, \ i=1,2,\ldots,l+1 \quad (4)$$

The unclassified examples are represented, it is assumed, as the values taken by n numerical attributes and so $X=R^n$.

This quadratic optimisation problem is applied not to the attribute vectors $x_i$ themselves, but to their images $V(x_i)$ under some predetermined function $V:X \to H$ taking values in a Hilbert space, which leads to replacing the dot product $x_i \cdot x_j$ in the optimisation problem (3)–(4) by the kernel function $$K(x_i, x_j) = V(x_i) \cdot V(x_j)$$

The final optimisation problem is, therefore, $$\sum_{i=1}^{l+1} \alpha_i - \frac{1}{2}\sum_{i,j=1}^{l+1} y_i y_j \alpha_i \alpha_j K(x_i, x_j) \to \max$$

under the "box" constraints $$0 \leq \alpha_i \leq C, \ i=1,2,\ldots,l+1$$

this quadratic optimisation problem can be solved using standard packages.

The Lagrange multiplier $\alpha_i$, $i \in \{1,\ldots,l+1\}$, reflects the "strangeness" of the example $(x_i, y_i)$; we expect that $\alpha_{l+1}$ will be large in the wrong completions.

For $y \in Y$, define $$d(y) := \frac{|\{i : \alpha_i \geq \alpha_{l+1}\}|}{l+1}$$

therefore $d(y)$ is the p-value associated with the completion y (y being an alternative notation for $y_{l+1}$). The confidence prediction function $f$, which is at the core of this invention, can be expressed as $$f_\beta(x_1, y_1, \ldots, x_l, y_l, x_{l+1}) := \{y : d(y) > 1-\beta\}$$

The most interesting case is where the prediction set given by $f_\beta$ is a singleton; therefore, the most important features of the confidence prediction procedure $\{f_\beta\}$ at the data $(x_1, y_1), \ldots, (x_l, y_l), x_{l+1}$ are:

the largest $\beta=\beta_0$ for which $f_\beta((x_1, y_1), \ldots, (x_l, y_l), x_{l+1})$ is a singleton (assuming such a $\beta$ exists);

the classification F $((x_1, y_1), \ldots, (x_l, y_l), x_{l+1})$ defined to be that $y \in Y$ for which $f_{\beta_0}((x_1, y_1), \ldots, (x_l, y_l), x_{l+1})$ is $\{y\}$.

$F((x_1, y_1), \ldots, (x_l, y_l), x_{l+1})$ defined in this way is called the $f$-optimal prediction algorithm; the corresponding $\beta_0$ is called the confidence level associated with F.

Another important feature of the confidence estimation function $\{f_\beta\}$ at the data $(x_1, y_1), \ldots, (x_l, y_l), x_{l+1}$ is the largest $\beta=\beta_*$ for which $f_\beta((x_1, y_1), \ldots, (x_l, y_l), x_{l+1})$ is the empty set. We call $1-\beta_*$ the credibility of the data set $(x_1, y_1), \ldots, (x_l, y_l), x_{l+1}$; it is the p-value of a test for checking the iid assumption. Where the credibility is very small, either the training set $(x_1, y_1), \ldots, (x_l, y_l)$ or the new unclassified example $x_{l+1}$, are untypical, which renders the prediction unreliable unless the confidence level is much closer to 1, than is $1-\beta_*$. In general, the sum of the confidence and credibility is between 1 and 2; the success of the prediction is measured by how close this sum is to 2.

With the data classifier of the present invention operated as described above, the following menus or choices may be offered to a user:

1. Prediction and Confidence

2. Credibility

3. Details.

A typical response to the user's selection of choice 1 might be prediction: 4, confidence: 99%, which means that 4 will be the prediction output by the $f$-optimal F and 99% is the confidence level of this prediction. A typical response to choice 2 might be credibility: 100%, which gives the computed value of credibility. A typical response to choice 3 might be:

| 0 | 1 | 2 | 3 | 4 | 5 | 6 | 7 | 8 | 9 |
|---|---|---|---|---|---|---|---|---|---|
| 0.1% | 1% | 0.2% | 0.4% | 100% | 1.1% | 0.6% | 0.2% | 1% | 1% | the complete set of p-values for all possible completions. The latter choice contains the information about $F((x_1, y_1), \ldots, (x_l, y_l), x_{l+1})$ (the character corresponding to the largest p-value), the confidence level (one minus the second largest p-value) and the credibility (the largest p-value).

This mode of using the confidence prediction function $f$ is not the only possible mode: in principle it can be combined with any prediction algorithm. If G is a prediction algorithm, with its prediction $y:=G((x_1, y_1), \ldots, (x_l, y_l), x_{l+1})$ we can associate the following measure of confidence:

$$c(y):=\max\{\beta: f_\beta(x_1, y_1, \ldots, x_l, y_l, x_{l+1}) \subseteq \{y\}\}$$

The prediction algorithm F described above is the one that optimises this measure of confidence.

The table shown in FIG. 4 contains the results of an experiment in character recognition using the data classifier of the present invention. The table shows the results for a test set of size 10, using a training set of size 20 (not shown). The kernel used was $K(x, y)=(x \cdot y)^3/256$.

It is contemplated that some modifications of the optimisation problem set out under equations (I) and (2) might have certain advantages, for example, $$\frac{1}{2}(w \cdot w) + C\left(\sum_{i=1}^{l+1} \xi_i^2\right) \to \min,$$

subject to the constraints $$y_i((x_i \cdot w)+b)=1-\xi_i, i=1, \ldots, l+1$$

It is further contemplated that the data classifier described above may be particularly useful for predicting the classification of more than one example simultaneously; the test statistic used for computing the p-values corresponding to different completions might be the sum of the ranks of αs corresponding to the new examples (as in the Wilcoxon rank-sum test).

Figure 2:
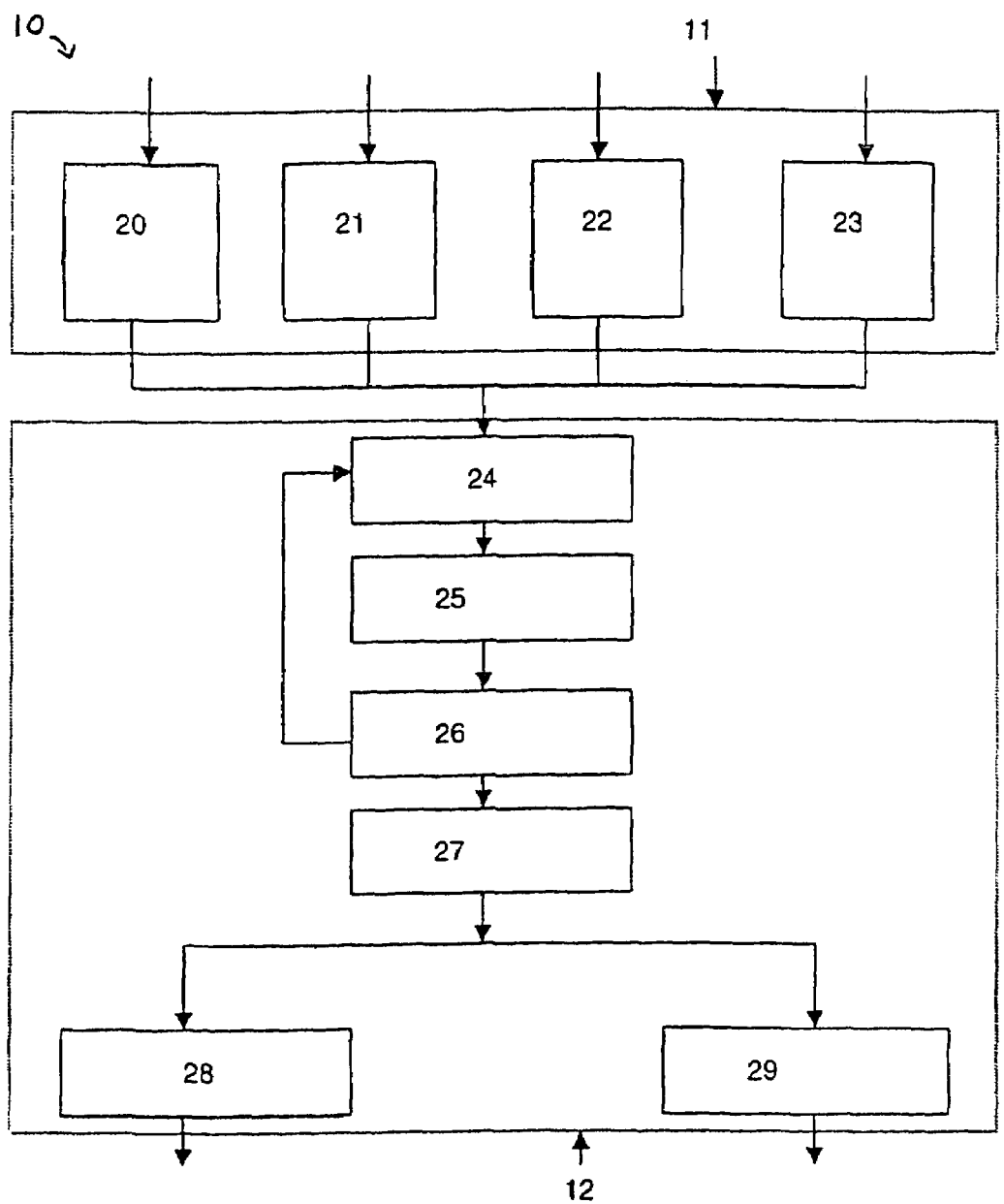
FIG. 2 is a schematic diagram of the operation of data classification apparatus of FIG. 1.

In practice, as shown in FIG. 2, a training dataset is input 20 to the data classifier. The training dataset consists of a plurality of data vectors each of which has an associated known classification allocated from a set of classifications. For example, in numerical character recognition, the set of classifications might be the numerical series 0–9. The set of classifications may separately be input 21 to the data classifier or may be stored in the ROM 14. In addition, some constructive representation of the measurable space of the data vectors may be input 22 to the data classifier or again may be stored in the ROM 14. For example, in the case of numerical character recognition the measurable space might consist of 16×16 pixellated grey-scale images. Where the measurable space is already stored in the ROM 14 of the data classifier, the interface 16 may include input means (not shown) to enable a user to input adjustments for the stored measurable space. For example, greater definition of an image may be required in which case the pixellation of the measurable space could be increased.

One or more data vectors for which no classification is known are also input 23 into the data classifier. The training dataset and the unclassified data vectors along with any additional information input by the user are then fed from the input device 11 to the processor 12.

Firstly, each one of the one or more unclassified data vectors is provisionally individually allocated 24 a classification from the set of classifications. An individual strangeness value $\alpha_i$ is then determined 25 for each of the data vectors in the training set and for each of the unclassified data vectors for which a provisional classification allocation has been made. A classification set is thus generated containing each of the data vectors in the training set and the one or more unclassified data vectors with their allocated provision classifications and the individual strangeness values $\alpha_i$ for each data vector. A plurality of such classification sets is then generated with the allocated provisional classifications of the unclassified data vectors being different for each classification set.

Computation of a single strangeness value, the p-value, for each classification set containing the complete set of training data vectors and unclassified vectors with their current allocated classification is then performed 26, on the basis of the individual strangeness values $\alpha_i$ determined in the previous step. This p-value and the associated set of classifications is transferred to the memory 13 for future comparison whilst each of the one or more unclassified data vectors is provisionally individually allocated with the same or a different classification. The steps of calculating individual strangeness values 25 and the determination of a p-value 26 are repeated in each iteration for the complete set of training data vectors and the unclassified data vectors, using different classification allocations for the unclassified data vectors each time. This results in a series of p-values being stored in the memory 13 each representing the strangeness of the complete set of data vectors with respect to unique classification allocations for the one or more unclassified data vectors.

The p-values stored in the memory are then compared 27 to identify the maximum p-value and the next largest p-value. Finally, the classification set of data vectors having the maximum p-value is supplied 28 to the output terminal 15. The data supplied to the output terminal may consist solely of the classification(s) allocated to the unclassified data vector(s), which now represents the predicted classification, from the classification set of data vectors having the maximum p-value.

Furthermore, a confidence value for the predicted classification is generated 29. The confidence value is determined based on the subtraction of the next largest p-value from 1. Hence, if the next largest p-value is large, the confidence of the predicted classification is small and if the next largest p-value is small, the confidence value is large. Choice 1 referred to earlier, provides a user with predicted classifications for the one or more unknown data vectors and the confidence value.

Where an alternative prediction algorithm is to be used, the confidence value will be computed by subtracting from 1 the largest p-value for the sets of training data vectors and new vectors classified differently from the predicted (by the alternative method) classification.

Additional information in the form of the p-values for each of the sets of data vectors with respect to the individual allocated classifications may also be supplied (choice 3) or simply the p-value for the predicted classification (choice 2).

With the data classifier and method of data classification described above, a universal measure of the confidence in any predicted classification of one or more unknown data vectors is provided. Moreover, at no point is a general rule or multidimensional hyperplane extracted from the training set of data vectors. Instead, the data vectors are used directly to calculate the strangeness of a provisionally allocated classification(s) for one or more unknown data vectors.

While the data classification apparatus and method have been particularly shown and described with reference to the above preferred embodiment, it will be understood by those skilled in the art that various modifications in form and detail may be made therein without departing from the scope and spirit of the invention. Accordingly, modifications such as those suggested above, but not limited thereto, are to be considered within the scope of the invention.

The invention claimed is:

1. A data classification apparatus comprising:
an input device for receiving a plurality of training classified examples and at least one unclassified example;
a memory for storing said classified and unclassified examples;
an output terminal for outputting a predicted classification for said at least one unclassified example; and
a processor for identifying the predicted classification of said at least one unclassified example
wherein the processor includes:
classification allocation means for allocating potential classifications to each said unclassified example and for generating a plurality of classification sets, each said classification set containing said plurality (l) of training classified examples with their classification and said at least one unclassified example (l+1) with its said allocated potential classification;
assay means including an example valuation device which determines individual strangeness values ($\alpha_i$) for each said training classified example (i=1,2 ... l) and said at least one unclassified example (i=l+1) having an allocated potential classification (y), the assay means determining a single strangeness value (d(y)) valid under the independently and identically distributed assumption for each said classification set in dependence on said individual strangeness values ($\alpha_i$) of each example by the formula $$d(y) = \frac{|\{i : \alpha_i \geq \alpha_{l+1}\}|}{l+1}, \text{ where } i = 1, 2 \ldots l, l+1;$$

a comparative device for selecting the classification set to which the most likely allocated potential classification for said at least one unclassified example belongs, wherein said predicted classification output by the output terminal is said most likely allocated classification according to said single strangeness values assigned by said assay means; and
a strength of prediction monitoring device for determining a confidence value for said predicted classification on the basis of said single strangeness value assigned by said assay means to one of said classification sets to which the second most likely allocated potential classification of said at least one unclassified example belongs.

2. A data classification apparatus as claimed in claim 1, wherein Lagrange multipliers are used to determine said individual strangeness values.

3. A data classification apparatus comprising:
an input device for receiving a plurality of training classified examples and at least one unclassified example;
a memory for storing said classified and unclassified examples;
stored programs including an example classification program;
an output terminal for outputting a predicted classification for said at least one unclassified example; and
a processor controlled by said stored programs for identifying the predicted classification of said at least one unclassified example, wherein said processor includes:
classification allocation means for allocating potential classifications to each said unclassified example and for generating a plurality of classification sets, each said classification set containing said plurality (l) of training classified examples with their classification and said at least one unclassified example (l+1) with its allocated potential classification;
assay means including an example valuation device which determines individual strangeness values ($\alpha_i$) for each said training classified example (i=1,2 ... l) and said at least one unclassified example (i=l+1) having an allocated potential classification (y), the assay means determining a single strangeness value (d(y)) valid under the independently and identically distributed assumption for each said classification set in dependence on said individual strangeness values ($\alpha_i$) of each example by the formula $$d(y) = \frac{|\{i : \alpha_i \geq \alpha_{l+1}\}|}{l+1}, \text{ where } i = 1, 2 \ldots l, l+1;$$

a comparative device for selecting the classification set to which the most likely allocated potential classification for said at least one unclassified example belongs, wherein the predicted classification output by said output terminal is the most likely allocated potential classification according to said single strangeness values assigned by said assay means and
a strength of prediction monitoring device for determining a confidence value for said predicted classification on the basis of said single strangeness value assigned by said assay means to one of said classification sets to which the second most likely allocated potential classification of said at least one unclassified example belongs.

4. A computer-implemented data classification method comprising:
inputting a plurality of training classified examples and at least one unclassified example;
identifying a predicted classification of said at least one unclassified example which includes,
allocating potential classifications to each said unclassified example;
generating a plurality (l) of classification sets, each said classification set containing said plurality of training classified examples with their classification and said at least one unclassified example (l+1) with its allocated potential classification;
determining an individual strangeness value ($\alpha_i$) for each said training classified example (i=1,2 ... l) and said at least one unclassified example (i=l+1) having an allocated potential classification (y), and a single strangeness value (d(y)) valid under the independently and identically distributed assumption for each said classification set in dependence on the individual strangeness values ($\alpha_i$) of each example by the formula $$d(y) = \frac{|\{i : \alpha_i \geq \alpha_{l+1}\}|}{l+1}, \text{ where } i = 1, 2 \ldots l, l+1;$$

selecting the said classification set to which the most likely allocated potential classification for said at least one unclassified example belongs, wherein said predicted classification is the most likely allocated potential classification in dependence on said single strangeness values;

determining a confidence value for said predicted classification on the basis of the single strangeness value assigned to one of said classification sets to which the second most likely allocated potential classification for said at least one unclassified example belongs; and outputting said predicted classification for said at least one unclassified example and said confidence value for said predicted classification.

5. A computer-implemented data classification method as claimed in claim 4, wherein said selected classification set is selected without the application of any general rules determined from the said training set.

6. A classification program stored on a computer readable medium for classifying data by performing the following steps:

generating a plurality of classification sets, each said classification set containing a plurality (l) of training classified examples with their classification and at least one unclassified example (l+1) that has been allocated a potential classification;

determining an individual strangeness value ($\alpha_i$) for each said training classified example (i=1,2 ... l) and said at least one unclassified example (i=l+1) having an allocated potential classification (y), and a single strangeness value (d(y)) valid under the independently and identically distributed assumption for each said classification set in dependence on said individual strangeness values ($\alpha_i$) of each example by the formula $$d(y) = \frac{|\{i : \alpha_i \geq \alpha_{l+1}\}|}{l+1}, \quad \text{where } i = 1, 2 \ldots l, l+1;$$

selecting the classification set to which the most likely allocated potential classification for the said at least one unclassified example belongs, wherein the predicted classification is the most likely allocated potential classification in dependence on said single strangeness values; and determining a confidence value for said predicted classification on the basis of said single strangeness value assigned to one of said classification sets to which the second most likely allocated potential classification for said at least one unclassified example belongs.

* * * * *